(12) United States Patent
Xu et al.

(10) Patent No.: US 7,638,243 B2
(45) Date of Patent: Dec. 29, 2009

(54) STABILIZED NONAQUEOUS ELECTROLYTES FOR RECHARGEABLE BATTERIES

(75) Inventors: Wu Xu, Broadview Heights, OH (US); Zhongyi Deng, Valley View, OH (US); Pascal Bolomey, Solon, OH (US)

(73) Assignee: Novolyte Technologies Inc., Zachary, LA (US)

( * ) Notice: Subject to any disclaimer, the term of this patent is extended or adjusted under 35 U.S.C. 154(b) by 0 days.

(21) Appl. No.: 11/387,142

(22) Filed: Mar. 22, 2006

(65) Prior Publication Data

US 2007/0224515 A1      Sep. 27, 2007

(51) Int. Cl.
*H01M 6/16* (2006.01)
*H01G 9/02* (2006.01)

(52) U.S. Cl. .................... 429/327; 429/326; 252/62.2

(58) Field of Classification Search .............. 429/326; 252/62.2
See application file for complete search history.

(56) References Cited

U.S. PATENT DOCUMENTS

| 4,713,305 | A  | 12/1987 | Van Alpen |
| 6,068,950 | A  | 5/2000  | Gan et al. |
| 6,482,549 | B2 | 11/2002 | Yoshimura et al. |
| 6,548,212 | B1 | 4/2003  | Heider |
| 6,787,267 | B2 | 9/2004  | Tsujioka et al. |
| 6,800,400 | B2 | 10/2004 | Ota et al. |
| 6,872,493 | B2 | 3/2005  | Yamada et al. |
| 6,939,647 | B1 | 9/2005  | Jow et al. |
| 6,987,163 | B2 | 1/2006  | Cabasso et al. |
| 6,998,069 | B1 | 2/2006  | Coluccia et al. |
| 7,172,834 | B1* | 2/2007 | Jow et al. ............... 429/188 |
| 7,459,237 | B2 | 12/2008 | Totir et al. |
| 2003/0113605 | A1 | 6/2003 | Hidaka et al. |
| 2004/0034253 | A1 | 2/2004 | Angell et al. |
| 2004/0058248 | A1* | 3/2004 | Inoue ................. 429/235 |
| 2004/0142246 | A1 | 7/2004 | Han et al. |
| 2005/0008939 | A1 | 1/2005 | Ota et al. |

FOREIGN PATENT DOCUMENTS

| JP | 10-247517 | * | 9/1998 |
| JP | 2004-014351 | * | 1/2004 |

OTHER PUBLICATIONS

IPDL JPO Machine Translation of JP 10-247517, (Publication date of Sep. 14, 1998).*
IPDL JPO Machine Translation for JP 2004-014351 (Publication date of Jan. 2004).*
Search Report and Opinion for related application PCT/US07/63639.

* cited by examiner

*Primary Examiner*—Dah-Wei D Yuan
*Assistant Examiner*—Maria J Laios
(74) *Attorney, Agent, or Firm*—Rankin, Hill & Clark LLP

(57) ABSTRACT

The invention relates to the use of aromatic phosphite compounds as stabilizers for nonaqueous electrolytic solutions containing halogenated salts such as $LiPF_6$ and $LiBF_4$. The electrolyte containing such a phosphite exhibits excellent shelf life storage at ambient and high temperatures. The electrolytic solution is suitable for use in electrochemical cells such as lithium (ion) rechargeable batteries and supercapacitors.

16 Claims, No Drawings

STABILIZED NONAQUEOUS ELECTROLYTES FOR RECHARGEABLE BATTERIES

BACKGROUND OF THE INVENTION

1. Field of Invention

The present invention relates generally to the field of nonaqueous electrolytes, electric current producing cells, and energy storage cells. More particularly, the invention pertains to nonaqueous electrolytes comprising (a) one or more solvents; (b) one or more ionic salts; and (c) one or more additives. Electric current producing cells, energy storage cells comprising non-aqueous electrolytes, and methods of making nonaqueous electrolytic solutions with aromatic phosphite compounds as stabilizers for halogenated salts in lithium and lithium ion rechargeable batteries, supercapacitors, and so on, are disclosed herein.

2. Description of Related Art

Electric current producing cells such as batteries consist of pairs of electrodes of opposite polarity separated by electrolytic solution, which includes a solvent and a solute. The charge flow between electrodes is maintained by an ionically conducting solute, i.e., a salt. The non-aqueous electrolytic solutions, which are used in lithium and lithium ion batteries, are made by dissolving lithium salts in a variety of organic solvents. In particular, nonaqueous electrolytes comprising lithium hexafluorophosphate ($LiPF_6$) exhibit very good electrochemical stability and conductivity. However, $LiPF_6$ is not thermally stable and readily decomposes by hydrolysis, as set forth in the following reactions:

$$LiPF_6 \rightarrow LiF + PF_5 \quad (1)$$

$$LiPF_6 + H_2O \rightarrow 2HF + LiF + POF_3 \quad (2)$$

Thermal decomposition of $LiPF_6$ occurs at elevated temperatures (Reaction 1), and is accelerated in solution due to the reactions of phosphorus pentafluoride ($PF_5$) and solvents because $PF_5$ is not only a very strong Lewis acid that will catalyze the decomposition (or polymerization) of the electrolyte solvents but also a strong fluorinating agent that readily reacts with organic solvents. It is believed that $PF_5$ is a major cause of thermal decomposition of the electrolytes of lithium ion batteries.

Hydrolysis of $LiPF_6$ (Reaction 2) generally occurs due to the presence of protic impurities such as moisture, alcohols and acidic impurities in the electrolytic solution. Accordingly, water, alcohols and acidic impurities, especially hydrogen fluoride (HF) are undesirable in lithium and lithium-ion battery systems. The strong acid HF is especially harmful to batteries because it reacts with electrode active materials and corrodes the solid electrolyte interface (SEI), which results in poor battery performance.

It may appear that deactivation or removal of $PF_5$ in electrolytic solutions will diminish or prevent the subsequent decomposition reactions of the electrolytes, and hence increase the thermal stability of the electrolytes, which in turn improves thermal stability and high temperature performance of batteries made therewith. This deactivation or removal of $PF_5$ can be achieved by complexing $PF_5$ with a Lewis base. Zhang et al. found that tris(2,2,2-trifluoroethyl)phosphite, which has a Lewis basic P(III) center, can stabilize an electrolyte of 1.2M $LiPF_6$ in EC/PC/EMC (3:3:4) for two weeks at 60° C. and act as a flame-retardant co-solvent for nonflammable electrolytes in lithium ion batteries (see Electrochem. Solid-State Letters, 5 (9), A206-A208 (2002), and J. Power Sources, 113, 166-172 (20003), both of which are hereby incorporated by reference in their entirety). U.S. Pat. No. 6,939,647 (incorporated by reference in its entirety) discloses electrolytes containing 1-50 wt % of trialkyl phosphites such as partially fluorinated alkyl phosphites. Li et al. also reported the stabilization of 1.0M $LiPF_6$ in EC/DMC/DEC (1:1:1) with Lewis bases such as pyridine, hexamethoxycyclotriphosphazene, and hexamethylphosphoramide by the formation of base:$PF_5$ complexes (see J. Electrochem. Soc., 152 (7), A1361-A1365 (2005); incorporated herein by reference in its entirety).

SUMMARY OF THE INVENTION

The present invention provides a nonaqueous electrolytic solution having a phosphite compound containing at least one aromatic group whose chemical structure is generally depicted by Formula 1 below, to act as a stabilizer for halogenated salts in lithium and lithium ion rechargeable batteries.

$$P(OA^1R^1_m)(OA^2R^2_n)(OA^3R^3_p) \quad \text{Formula 1}$$

In Formula 1, each of substituents $A^1$, $A^2$, and $A^3$ is independently an aryl or alkyl residue, with the proviso that all three of $A^1$, $A^2$, and $A^3$ cannot be alkyl residues simultaneously, wherein each of $R^1$, $R^2$, and $R^3$ may be the same or different and is independently selected from the group consisting of hydrogen, halogen, $C_1$-$C_{20}$ alkyl, $C_1$-$C_{20}$ substituted alkyl, phenyl and substituted phenyl, and wherein each of m, n and p is independently 0 to 5. Further, aromatic phosphite compound has a concentration less than 5 wt % in the electrolytic solutions. A secondary battery comprising the aforementioned non-aqueous electrolytic solution is also envisioned.

The invention also provides a method of maintaining below a reading of 50 the APHA color of a non-aqueous electrolytic solution for use in a secondary battery after storage at 50° C. for two months, comprising contacting a non-aqueous electrolytic solution with about 0.01 to about 5 wt % of a non-aqueous electrolytic solution disclosed herein.

The electrolytic solution comprises (a) at least one lithium salt, (b) at least one solvent, (c) an aromatic phosphite, and may include other additives. Typical halogenated lithium salts include $LiPF_6$, $LiBF_4$, $LiAsF_6$, $LiSbF_6$, and $LiAlCl_4$. Typical organic solvents include ethylene carbonate (EC), propylene carbonate (PC), dimethyl carbonate (DMC), diethyl carbonate (DEC), ethylmethyl carbonate (EMC), γ-butyrolactone (GBL), methyl butyrate (MB), and propyl acetate (PA).

The inventors have discovered that an aromatic phosphite compound can be used to stabilize electrolytic solutions containing halogenated lithium salts. The electrolytic solutions using such phosphites are stable over long shelf lives at high storage temperatures. Decomposition and hydrolysis of the halogenated lithium salts is reduced, and stability of the lithium salts and electrolytic solutions is increased. Preferred embodiments of the invention are described herein for $LiPF_6$-based electrolytes but the invention may be used with other halogenated lithium salts such as $LiBF_4$, $LiAsF_6$, $LiSbF_6$, $LiAlCl_4$, combinations thereof, and combinations with other lithium salts such as $LiClO_4$, $LiB(C_2O_4)$, $LiCF_3SO_3$, $LiN(SO_2CF_3)_2$, and so on.

The solvents useful herein include one or more conventional solvents, for example, cyclic carbonate esters such as ethylene carbonate, propylene carbonate, butylene carbonate, vinylene carbonate, and vinyl ethylene carbonate; linear carbonate esters, such as dimethyl carbonate, diethyl carbonate, ethyl methyl carbonate, methyl propyl carbonate; other esterbased solvents such as γ-butyrolactone, propyl acetate, methyl butyrate; ethers such as dioxolane, dimethoxyethane, tetrahydrofuran, and mixtures thereof. For example, the solvent may be a mixture of ethylene carbonate, dimethyl carbonate, and ethyl methyl carbonate.

DETAILED DESCRIPTION OF THE INVENTION

The following embodiments describe the preferred modes presently contemplated for carrying out the invention and are not intended to describe all possible modifications and variations consistent with the spirit and purpose of the invention. These and other features and advantages of the present invention will become more readily apparent to those skilled in the art upon consideration of the following detailed description that described both the preferred and alternative embodiments of the present invention.

The present invention provides a stabilized nonaqueous electrolytic solution including an aromatic phosphite compound, as well as a battery including such a nonaqueous electrolytic solution. Each component of such a battery is detailed hereinbelow.

Phosphite Stabilizers. The general chemical structure of phosphite stabilizers useful herein is represented by Formula 1.

Formula 1

In the formula, $A^1$, $A^2$, and $A^3$ is each independently an aryl or alkyl residue, with the proviso that all three of $A^1$, $A^2$, and $A^3$ cannot be alkyl residues simultaneously, wherein each of $R^1$, $R^2$, and $R^3$ may be the same or different and is independently selected from the group consisting of hydrogen, halogen, $C_1$-$C_{20}$ alkyl, $C_1$-$C_{20}$ substituted alkyl, phenyl and substituted phenyl, and wherein each of m, n and p is independently 0 to 5. In a preferred embodiment, at least one of $R^1$, $R^2$, and $R^3$ further comprises a moiety selected from the group consisting of —O—, —S—, —CO—, —CO$_2$—, —SO—, —SO$_2$—, —NR$^4$—, —NR$^5$R$^6$, —PR$^7$—, and —Si(R$^8$R$^9$)—, wherein each of $R^4$ to $R^9$ is independently a hydrogen, halogen, $C_1$-$C_{20}$ saturated or unsaturated alkyl or substituted alkyl, phenyl, or substituted phenyl. In a further preferred embodiment, at least one of $R^4$ through $R^9$ further comprises a moiety selected from the group consisting of —O—, —S—, —CO—, —CO$_2$—, —SO—, —SO$_2$—, amine, phosphorous linkage and silica linkage.

Non-limiting examples of aryl and substituted aryl groups include phenyl, o-tolyl, m-tolyl, p-tolyl, p-chlorophenyl, p-fluorophenyl, p-methoxyphenyl, etc. Examples of alkyl groups include methyl, ethyl, n-propyl, isopropyl, n-butyl, sec-butyl, t-butyl, iso-butyl, n-hexyl, 2-methyl hexyl, isodecyl, octadecyl, oleyl, and the like. Examples of the substituted alkyl group include silylated alkyl group such as trimethylsilyl, alkoxyalkyl group such as 2-methoxyethyl and 2-ethoxyethyl, and halogenated alkyl group, especially fluorinated alkyl group, such as 2-chloroethyl (ClCH$_2$CH$_2$), 2-fluoroethyl (FCH$_2$CH$_2$), 2,2-difluoroethyl (CF$_2$HCH$_2$), 2,2,2-trifluoroethyl (CF$_3$CH$_2$), 2,2,3,3,3-pentafluoropropyl (CF$_3$CF$_2$CH$_2$), 1,1,1,3,3,3-hexafluoro-2-propyl ((CF$_3$)$_2$CH), 2,2,3,3,4,4,4-heptafluorobutyl (CF$_3$CF$_2$CF$_2$CH$_2$), and perfluoro-t-butyl ((CF$_3$)$_3$C).

Non-limiting examples of aromatic phosphites according to the present invention include triphenyl phosphite, tris(o-tolyl)phosphite, tris(m-tolyl)phosphite, tris(p-tolyl) phosphite, tris(p-chlorophenyl)phosphite, tris(p-fluorophenyl) phosphite, tris(p-methoxyphenyl) phosphite, dimethyl phenyl phosphite, diethyl phenyl phosphite, diphenyl methyl phosphite, tris(2,4-di-tert-butylphenyl)phosphite, tris(nonylphenyl)phosphite, bis(2,4-di-tert-butylphenyl)pentaerythritol diphosphite, bis(2,4-dicumylphenyl) pentaerythritol diphosphite. Preferably, the phosphite compounds are triphenyl phosphite, tris(p-tolyl)phosphite, and tris(p-fluorophenyl)phosphite.

The inventors have discovered that aromatic phosphite compounds can be used to stabilize electrolytic solutions containing halogenated lithium salts. Resulting electrolytic solutions are highly stable at high temperatures and over long storage lives.

Salts. The salts herein are ionic salts containing at least one metal ion. Typically this metal ion is lithium (Li$^+$). The salts herein function to transfer charge between the anode and the cathode of a battery. The lithium salts are preferably halogenated, for example, LiPF$_6$, LiBF$_4$, LiClO$_4$, LiAsF$_6$, LiTaF$_6$, LiAlCl$_4$, LiCF$_3$SO$_3$, Li$_2$B$_{10}$C$_{10}$, Li$_2$B$_{10}$F$_{10}$, Li$_2$B$_{12}$H$_x$F$_{(12-x)}$, LiBF$_y$(R$_F$)$_{4-y}$, LiPF$_z$(R$_F$)$_{6-z}$, LiBF$_2$[C$_2$O$_4$(CE$_2$)$_w$], LiPF$_2$[C$_2$O$_4$(CE$_2$)$_w$]$_2$, LiPF$_4$[C$_2$O$_4$(CE$_2$)$_w$], LiC(SO$_2$C$_k$F$_{2k+1}$) (SO$_2$C$_m$F$_{2m+1}$)(SO$_2$C$_n$F$_{2n+1}$), LiN(SO$_2$C$_m$F$_{2m+1}$) (SO$_2$C$_n$F$_{2n+1}$), LiN(SO$_2$C$_p$F$_{2p}$SO$_2$), and LiC(SO$_2$C$_p$F$_{2p}$SO$_2$) (SO$_2$C$_q$F$_{2q+1}$), wherein E is H, F, or Cl; wherein R$_F$ is a perfluorinated $C_1$-$C_{20}$ alkyl group or perfluorinated aromatic group; wherein 1≦k, m, n, p, q≦10; 0≦w≦4; 0≦x≦12; 0≦y≦3; and 0≦z≦5.

Further suitable lithium salts include chelated orthoborates and chelated orthophosphates (collectively, hereinafter, "ortho-salts"). Exemplary ortho-salts include lithium bis(oxalato)borate (LiBOB), lithium bis(malonato) borate (LiBMB), lithium bis(difluoromalonato) borate (LiBDFMB), lithium (malonato oxalato) borate (LiMOB), lithium (difluoromalonato oxalato) borate (LiDFMOB), lithium tris (oxalato)phosphate (LiTOP), and lithium tris (difluoromalonato)phosphate (LiTDFMP). More detail on ortho-salts can be found in commonly owned copending U.S. application Ser. No. 11/113,823, filed Apr. 25, 2005, which is incorporated by reference in its entirety.

Broadly, the concentration of salts in the electrolytic solution is about 0.01-2.5 M (moles per liter). Preferably the total of all salts in the electrolytic solution is about 1 wt % to about 50 wt %, preferably about 3 wt % to about 35 wt % and more preferably about 5 wt % to about 25 wt %. Most preferably the electrolytic solution comprises LiPF$_6$.

Solvent. The solvent is a non-aqueous, aprotic, polar organic substance which dissolves the salt at room temperature, i.e., 25° C. Blends of more than one solvent may be used. Generally, solvents may be carbonates, carboxylates, lactones, phosphates, five or six member heterocyclic ring compounds, and organic compounds having at least one $C_1$-$C_4$ group connected through an oxygen atom to a carbon. Lactones may be methylated, ethylated and/or propylated. Generally, the electrolytic solution comprises at least one salt dissolved in at least one solvent. Useful solvents herein include ethylene carbonate, propylene carbonate, butylene carbonate, dimethyl carbonate, diethyl carbonate, dipropyl carbonate, dibutyl carbonate, ethyl methyl carbonate, methyl propyl carbonate, ethyl propyl carbonate, tetrahydrofuran, 2-methyl tetrahydrofuran, 1,3-dioxolane, 1,4-dioxane, 1,2-dimethoxyethane, 1,2-diethoxyethane, 1,2-dibutoxyethane, acetonitrile, dimethylformamide, methyl formate, ethyl formate, propyl formate, butyl formate, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, γ-butyrolactone, 2-methyl-γ-butyrolactone, 3-methyl-γ-butyrolactone, 4-methyl-γ-butyrolactone, β-propiolactone, δ-valerolactone, trimethyl phosphate, triethyl phosphate, tris(2- chloroethyl) phosphate, tris(2,2,2-trifluoroethyl)phosphate, tripropyl phosphate, triisopropyl phosphate, tributyl phosphate, trihexyl phosphate, triphenyl phosphate, tritolyl phosphate, and combinations thereof. Other solvents may be used so long as they are non-aqueous and aprotic, and are capable of dissolving the salts. Solvents commercially available under the Purolytes® name from Ferro Corporation, Cleveland, Ohio, are suitable.

Overall, the non-aqueous electrolytic solution comprises about 20 wt % to about 99 wt %, preferably about 50 wt % to about 97 wt % and more preferably about 70 wt % to about 95 wt % of one or more solvents. In a preferred embodiment, the solvent is selected from the group consisting of ethylene carbonate (EC), propylene carbonate (PC), dimethyl carbonate (DMC), ethyl methyl carbonate (EMC), diethyl carbonate (DEC) and combinations thereof. In another preferred embodiment, the solvent comprises about 1-60 wt % EC, about 1-99 wt % DMC, and about 1-99 wt % EMC. In another preferred embodiment, the non-aqueous solvent comprises EC, DMC and EMC in a weight ratio of 1:1:1.

Cathode. The cathode comprises a lithium metal oxide compound. In particular, the cathode comprises at least one lithium mixed metal oxide (MMO). Lithium MMOs contain at least one other metal selected from the group consisting of Mn, Co, Cr, Fe, Ni, V, and combinations thereof. For example the following lithium MMOs may be used in the cathode: $LiMnO_2$, $LiMn_2O_4$, $LiCoO_2$, $Li_2Cr_2O_7$, $Li_2CrO_4$, $LiNiO_2$, $LiFeO_2$, $LiNi_zCo_{1-z}O_2$ (0<z<1), $LiFePO_4$, $LiVPO_4$, $LiMn_{0.5}Ni_{0.5}O_2$, $LiMn_xNi_yCo_zO_2$ wherein 0<x,y,z<1, $LiNi_{1-r}Co_sMe_tO_2$ wherein Me may be one or more of $A^1$, Mg, Ti, B, Ga, or Si and 0<r,s,t<1, and $LiMc_{0.5}Mn_{1.5}O_4$ wherein Mc is a divalent metal, and mixtures thereof.

Anode. The anode may comprise carbon or compounds of lithium. The carbon may be in the form of graphite. Lithium metal anodes may be used. Lithium mixed metal oxides (MMOs) such as $LiMnO_2$ and $Li_4Ti_5O_{12}$ are also envisioned. Alloys of lithium with transition or other metals (including metalloids) may be used, including LiAl, LiZn, $Li_3Bi$, $Li_3Cd$, $Li_3Sd$, $Li_4Si$, $Li_{4.4}Pb$, $Li_{4.4}Sn$, $LiC_6$, $Li_3FeN_2$, $Li_{2.6}Cu_{0.4}N$, and combinations thereof. The anode may further comprise an additional material such as a metal oxide including SnO, $SnO_2$, GeO, $GeO_2$, $In_2O$, $In_2O_3$, PbO, $PbO_2$, $Pb_2O_3$, $Pb_3O_4$, $Ag_2O$, AgO, $Ag_2O_3$, $Sb_2O_3$, $Sb_2O_4$, $Sb_2O_5$, SiO, ZnO, CoO, NiO, FeO, and combinations thereof.

Either the anode or the cathode, or both, may further comprise a polymeric binder. In a preferred embodiment, the binder may be polyvinylidene fluoride, styrene-butadiene rubber, polyamide or melamine resin, or combinations thereof.

The electrolytic solution in the present invention may further comprise one or more additives, such as a vinyl compound (e.g. vinylene carbonate, vinyl ethylene carbonate) to help generate a stable solid electrolyte interface at the surface of the graphite anode so as to increase the cycle life characteristic of the battery; or a sultone (e.g., 1,3-propane sultone, and 1,4-butane sultone) to prevent or to reduce gas generation of the electrolytic solution as the battery is charged and discharged at temperatures higher than ambient temperature, and/or an aromatic compound (e.g., biphenyl and cyclohexylbenzene) to prevent overcharge of the battery.

It is envisioned that the electrolytic solutions and batteries discussed herein have a wide range of applications, including, without limitation, radios, televisions, calculators, wrist watches, hearing aids, electronics such as computers, cell phones, games, and transportation applications such as battery powered and/or hybrid vehicles.

EXAMPLES

The following compositions represent exemplary embodiments of the invention. They are presented to explain the invention in more detail, and do not limit the invention.

(1) Electrolyte Preparation and Shelf Life Test

Example 1. Ethylene carbonate, dimethyl carbonate and ethyl methyl carbonate were mixed in a weight ratio of 1:1:1 to prepare a nonaqueous organic solvent mixture. 1.0M $LiPF_6$ was added into the above solvent mixture. Then triphenyl phosphite was added into the electrolytic solution in an amount of 5.0% by weight to give Example 1. The electrolytic solution was stored in an oven of 80° C. for one month and the color of the electrolyte was 19 APHA (PtCo), compared with 21 APHA of the electrolyte before storage, by Hach DR/2010 Portable Datalogging Spectrophotometer at λ=455 nm. As is known in the art, APHA is a single number yellowness index where each APHA unit is based on a dilution of a 500 ppm stock solution of PtCo. Distilled water has an APHA value of zero. The stock solution has an APHA value of 500. A detailed description of solution preparation and measurement procedures may be found in ASTM Designation D1209, "Standard Test Method for Color of Clear Liquids (Platinum-Cobalt Scale)."

Example 2 was prepared identically to Example 1, except that 3.0 wt % of triphenyl phosphite was used. The electrolytic solution was stored in an 80° C. oven for one month and the color of the electrolyte was 5 APHA, compared with an initial color of 23 APHA before storage.

Example 3 was prepared identically to Example 1, except that 1.0 wt % of triphenyl phosphite was used. The electrolytic solution was stored in a 65° C. oven for one month and the color of the electrolyte was 10 APHA, compared with an initial color of 22 APHA before storage.

Example 4 was prepared identically to Example 1, except that 0.5 wt % of triphenyl phosphite was used. The electrolytic solution was stored in a 50° C. oven for two months and the final color of the solution was only 2 APHA, compared with an initial color of 10 APHA before storage.

Example 5 was prepared identically to Example 1, except that 0.1 wt % of triphenyl phosphite was used. The electrolytic solution was stored in a 50° C. oven for two months and the final color of the solution was 14 APHA, compared with an initial color of 17 APHA before storage.

Example 6. Into the electrolytic solution of Example 4 was added 2.0% wt vinylene carbonate, to give Example 6. The color of the electrolyte after storage at 50° C. for two months was 14 APHA, same as the color of the electrolyte before storage.

The comparative examples represent the prior art.

Comparative Example 1. Ethylene carbonate, dimethyl carbonate and ethyl methyl carbonate were mixed in a weight ratio of 1:1:1 to prepare a nonaqueous organic solvent mixture. 1.0M $LiPF_6$ was added to the solvent mixture to give an electrolytic solution. The final color of the electrolytic solution after storage at 50° C. for 2 weeks was 69 APHA compared with an initial color of 23 APHA before storage.

Comparative Example 2. Into the electrolytic solution of Comparative Example 1 was added 2.0% wt vinylene carbonate to give Comparative Example 2. The final color of the electrolyte after storage at 50° C. for one week was 214 APHA, compared with an initial color of 12 APHA before storage.

(2) Preparation of a Cathode. A positive electrode slurry was prepared by dispersing $LiCoO_2$ (positive electrode active material, 90 wt %), poly(vinylidenefluoride) (PVdF, binder, 5 wt %), and acetylene black (electro-conductive agent, 5 wt %)

into 1-methyl-2-pyrrolidone (NMP). The slurry was coated on aluminum foil, dried, and compressed to give a cathode. The cathode was die-cut into discs by a punch with a diameter of 14.3 mm.

(3) Preparation of an Anode. Artificial graphite (as negative electrode active material, 95 wt %) and PVdF (as binder, 5 wt %) were mixed into NMP to give a negative active material slurry which was coated on copper foil, dried, and pressed to give a negative electrode. The anode electrode was die-cut into discs by a punch with a diameter of 15.9 mm.

(4) Assembly of a Lithium Ion Secondary Battery. In a dry box under an argon atmosphere, a lithium ion secondary battery was assembled using a 2032 type coin cell. That is, a cathode was placed on a cathode can, and a microporous polypropylene film (25 μm thickness and 19.1 mm diameter) was placed thereon as a separator. It was pressed with a polypropylene gasket, and then an anode was placed. A stainless steel spacer and spring were placed thereon to adjust thickness and to make a good contact. An electrolytic solution from each of Examples 1-4 and Comparative Example 1 was added to separate batteries and allowed to absorb. Finally, an anode cover was mounted thereon to seal the batteries by a crimper, thus completing the assembly of the coin type lithium ion secondary batteries.

(5) Testing of the Batteries. Evaluation of the aforementioned assembled batteries was carried out in the order (A) initial charging and discharging (confirmation of capacity) and (B) life cycle test.

A. Capacity Confirmation. Initial charging and discharging of the aforementioned assembled batteries were performed according to the constant current/voltage charging and constant current discharging method in a room temperature atmosphere. The battery was first charged up to 4.2 Volts (V) at a constant current rate of 0.5 mA/cm$^2$ (milliamps per square centimeter). After reaching 4.2 V, the battery was continually charged at a constant voltage of 4.2 V until the charging current reached 0.1 mA or less. Then the battery was discharged at a constant current rate of 0.5 mA/cm$^2$ until the cut-off voltage 3.0 V was reached. Standard capacity of a nonaqueous electrolyte secondary battery was 4.2 mAh (milliamp hours).

B. Life Cycle Test. Life cycle testing was conducted over 50 cycles at room temperature by charging the aforementioned initially charged/discharged batteries at a constant current rate of C/2 (2.1 mA) to 4.2 V and then charged at a constant voltage of 4.2 V until the current reached 0.1 mA or less. After that the battery was discharged at a constant current rate of C/2 (2.1 mA) until the cut-off voltage 3.0 V reached. Discharge capacity retention rate of cycle life (%)=($n^{th}$ cycle discharge capacity/$1^{st}$ cycle discharge capacity)×100%. First cycle efficiency is ($1^{st}$ cycle discharge capacity/$1^{st}$ cycle charge capacity)×100%. Table 1 displays the results of the life cycle testing.

TABLE 1

Discharge, cycle efficiency and capacity retention of selected secondary batteries

| Example | $1^{st}$ cycle discharge capacity (mAh) | $1^{st}$ cycle efficiency | $50^{th}$ cycle capacity retention |
|---|---|---|---|
| Example 1 | 2.20 | 62.9% | 19.1% |
| Example 2 | 3.48 | 83.6% | 75.9% |
| Example 3 | 3.52 | 85.4% | 105.4% |
| Example 4 | 3.90 | 89.8% | 89.7% |
| Comparative Example 1 | 3.56 | 80.5% | 81.8% |

It is also seen from Table 1 that when the aromatic phosphite such as triphenyl phosphite was added to electrolytic solutions in an amount of 3 wt % or less, the cell performance such as discharge capacity and capacity retention of the electrolytic solutions was improved or similar compared with the control solution. Cell performance suffered when 5 wt % of the aromatic phosphite was used.

Additional advantages and modifications will readily occur to those skilled in the art. Therefore, the invention in its broader aspects is not limited to the specific details and illustrative example shown and described herein. Accordingly, various modifications may be made without departing from the spirit or scope of the general invention concept as defined by the appended claims and their equivalents.

What is claimed is:

1. A secondary battery comprising
   a. an anode,
   b. a cathode comprising lithium, and
   c. an electrolytic solution comprising
      i. a non-aqueous solvent,
      ii. a solute, and
      iii. about 0.01 wt % to about 5 wt % of an aromatic phosphite compound selected from the group consisting of tris(p-fluorophenyl) phosphite), tris(perfluorophenyl) phosphite, di(p-fluorophenyl) phenyl phosphite, and di(perfluorophenyl) phenyl phosphite.

2. The secondary battery of claim 1 comprising about 0.05 to about 3 wt % of the aromatic phosphite compound.

3. The secondary battery of claim 1 comprising about 0.1 to about 2 wt % of the aromatic phosphite compound.

4. The secondary battery of claim 1 wherein the solute is present in a concentration of about 0.1 to about 2.5 M and is selected from the group consisting of LiPF$_6$, LiBF$_4$, LiClO$_4$, LiAsF$_6$, LiTaF$_6$, LiAlCl$_4$, LiCF$_3$SO$_3$, Li$_2$B$_{10}$Cl$_{10}$, Li$_2$B$_{10}$F$_{10}$, Li$_2$B$_{12}$H$_x$F$_{(12-x)}$ LiBF$_y$(R$_F$)$_{4-y}$, LiPF$_z$(R$_F$)$_{6-z}$, LiBF$_2$[C$_2$O$_4$(CE$_2$)$_w$], LiPF$_2$[C$_2$O$_4$(CE$_2$)$_w$]$_2$, LiPF$_4$[C$_2$O$_4$(CE$_2$)$_w$], LiN(SO$_2$C$_m$F$_{2m+1}$)(SO$_2$C$_n$F$_{2n+1}$), LiC(SO$_2$C$_k$F$_{2k+1}$)(SO$_2$C$_m$F$_{2m+1}$)(SO$_2$C$_n$F$_{2n+1}$), LiN(SO$_2$C$_p$F$_{2p}$SO$_2$), and LiC(SO$_2$C$_p$F$_{2p}$SO$_2$)(SO$_2$C$_q$F$_{2q+1}$), wherein E is H, F, or Cl; wherein R$_F$ is a perfluorinated C$_1$-C$_{20}$ alkyl group or perfluorinated aromatic group, wherein $1 \leq k, m, n, p, q, \leq 10$; $0 \leq w \leq 4$; $0 \leq x \leq 12$; $0 \leq y \leq 3$; and $0 \leq z \leq 5$.

5. The secondary battery of claim 1 wherein the non-aqueous solvent is selected from the group consisting of ethylene carbonate, propylene carbonate, butylene carbonate, dimethyl carbonate, diethyl carbonate, dipropyl carbonate, dibutyl carbonate, ethyl methyl carbonate, methyl propyl carbonate, ethyl propyl carbonate, tetrahydrofuran, 2-methyl tetrahydrofuran, 1,3-dioxolane, 1,4-dioxane, 1,2-dimethoxyethane, 1,2-diethoxyethane, 1,2-dibutoxyethane, acetonitrile, dimethylformamide, methyl formate, ethyl formate, propyl formate, butyl formate, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, γ-butyrolactone, 2-methyl-γ-butyrolactone, 3-methyl-γ-butyrolactone, 4-methyl-γ-butyrolactone, β-propiolactone, δ-valerolactone, trimethyl phosphate, triethyl phosphate, tris(2-chloroethyl) phosphate, tris(2,2,2-trifluoroethyl) phosphate, tripropyl phosphate, triisopropyl phosphate, tributyl phosphate, trihexyl phosphate, triphenyl phosphate, tritolyl phosphate, and combinations thereof.

6. The secondary battery of claim 1 wherein the cathode comprises a lithium mixed metal oxide selected from the group consisting of LiMnO$_2$, LiMn$_2$O$_4$, LiCoO$_2$, Li$_2$Cr$_2$O$_7$, Li$_2$CrO$_4$, LiNiO$_2$, LiFeO$_2$, LiNi$_x$Co$_{1-x}$O$_2$ (0<x<1), LiFePO$_4$, $LiMn_{0.5}Ni_{0.5}O_2$, $LiMn_xCo_yNi_zO_2$ wherein $0<x,y,z<1$, and $LiMc_{0.5}Mn_{1.5}O_4$ wherein Mc is a divalent metal, and mixtures thereof.

7. The secondary battery of claim 1, wherein the anode comprises a material selected from the group consisting of crystalline carbon, lithium metal, $LiMnO_2$, LiAl, LiZn, $Li_3Bi$, $Li_3Cd$, $Li_3Sb$, $Li_4Si$, $Li_{4.4}Pb$, $Li_{4.4}Sn$, $LiC_6$, $Li_3FeN_2$, $Li_{2.6}Co_{0.4}N$, $Li_{2.6}Cu_{0.4}N$, $Li_4Ti_5O_{12}$, and combinations thereof.

8. The secondary battery of claim 7, wherein the anode further comprises a material selected from the group consisting of SnO, $SnO_2$, GeO, $GeO_2$, $In_2O$, $In_2O_3$, PbO, $PbO_2$, $Pb_2O_3$, $Pb_3O_4$, $Ag_2O$, AgO, $Ag_2O_3$, $Sb_2O_3$, $Sb_2O_4$, $Sb_2O_5$, SiO, ZnO, CoO, NiO, FeO, and combinations thereof.

9. The secondary battery of claim 7, wherein the anode further comprises a binder selected from the group consisting of polyvinylidene fluoride, styrene-butadiene rubber, polyamide, melamine, and combinations thereof.

10. The secondary battery of claim 1 further comprising a salt additive selected from the group consisting of chelated orthoborate salts and chelated orthophosphate salts.

11. The secondary battery of claim 10 wherein the salt additive is selected from the group consisting of lithium bis(oxalato)borate, lithium bis(malonato) borate, lithium bis(difluoromalonato) borate, lithium (malonato oxalato) borate, lithium (difluoromalonato oxalato) borate, lithium tris(oxalato)phosphate, and lithium tris(difluoromalonato)phosphate.

12. A non-aqueous electrolytic solution for a secondary battery comprising
   a. a non-aqueous solvent,
   b. a solute, and
   c. an aromatic phosphite compound selected from the group consisting of tris(p-fluorophenyl) phosphite), tris(perfluorophenyl) phosphite, di(p-fluorophenyl) phenyl phosphite, and di(perfluorophenyl) phenyl phosphite.

13. The non-aqueous electrolytic solution of claim 12 wherein the solute is selected from the group consisting of $LiPF_6$, $LiBF_4$, $LiClO_4$, $LiAsF_6$, $LiTaF_6$, $LiAlCl_4$, $LiCF_3SO_3$, $Li_2B_{10}Cl_{10}$, $Li_2B_{10}F_{10}$, $Li_2B_{12}H_xF_{(12-x)}$ $LiBF_y(R_F)_{4-y}$, $LiPF_z(R_F)_{6-z}$, $LiBF_2[C_2O_4(CE_2)_w]$, $LiPF_2[C_2O_4(CE_2)_w]_2$, $LiPF_4[C_2O_4(CE_2)_w]$, $LiN(SO_2C_mF_{2m+1})(SO_2C_nF_{2n+1})$, $LiC(SO_2C_kF_{2k+1})(SO_2C_mF_{2m+1})(SO_2C_nF_{2n+})$, $LiN(SO_2C_pF_{2p}SO_2)$, and $LiC(SO_2C_pF_{2p}SO_2)(SO_2C_qF_{2q+1})$, wherein E is H, F, or Cl; wherein $R_F$ is a perfluorinated $C_1$-$C_{20}$ alkyl group or perfluorinated aromatic group, wherein $1 \leq k$, m, n, p, q, $\leq 10$; $0 \leq w \leq 4$; $0 \leq x \leq 12$; $0 \leq y \leq 3$; and $0 \leq z \leq 5$.

14. A method of maintaining below a reading of 50 the APHA color of a non-aqueous electrolytic solution for use in a secondary battery after storage at 50° for two months, comprising contacting a non-aqueous electrolytic solution with about 0.01 to about 5 wt % of an aromatic phosphite compound selected from the group consisting of tris(p-fluorophenyl) phosphite), tris(perfluorophenyl) phosphite, di(p-fluorophenyl) phenyl phosphite, and di(perfluorophenyl) phenyl phosphite.

15. A secondary battery comprising an electrolytic solution, wherein the electrolytic solution comprises a non-aqueous solvent, a solute, and triphenyl phosphite, provided that the concentration of triphenyl phosphite in the solution does not exceed 5 wt %, wherein the triphenyl phosphite is selected from the group consisting of tris(p-fluorophenyl) phosphite), tris(perfluorophenyl) phosphite, di(p-fluorophenyl) phenyl phosphite, and di(perfluorophenyl) phenyl phosphite.

16. A non-aqueous electrolytic solution for use in a secondary battery comprising a salt and triphenyl phosphite, provided that the concentration of triphenyl phosphite in the solution does not exceed 5 wt %, wherein the triphenyl phosphite is selected from the group consisting of tris(p-fluorophenyl) phosphite), tris(perfluorophenyl) phosphite, di(p-fluorophenyl) phenyl phosphite, and di(perfluorophenyl) phenyl phosphite.

* * * * *